United States Patent [19]

Nishiki et al.

[11] Patent Number: 5,584,976
[45] Date of Patent: Dec. 17, 1996

[54] GAS DIFFUSION ELECTRODE

[75] Inventors: Yoshinori Nishiki; Takahiro Ashida, both of Kanagawa; Takayuki Shimamune; Yasuo Nakajima, both of Tokyo, all of Japan

[73] Assignee: Permelec Electrode Ltd., Kanagawa, Japan

[21] Appl. No.: 636,185

[22] Filed: Apr. 22, 1996

[30] Foreign Application Priority Data

Apr. 28, 1995 [JP] Japan ................... 7-129241

[51] Int. Cl.⁶ ................... C25B 11/00
[52] U.S. Cl. ................... 204/290 R; 204/291; 429/42; 429/44
[58] Field of Search ................... 429/42, 44, 217, 429/219; 204/290 R, 291, 292, 284, 290 F; 428/613

[56] References Cited

U.S. PATENT DOCUMENTS

| | | | |
|---|---|---|---|
| 4,798,662 | 1/1989 | Clerc-Renaud et al. | 204/209 R |
| 4,900,419 | 2/1990 | Nishiki et al. | 204/291 X |
| 4,975,172 | 12/1990 | Yeager | 429/42 X |
| 5,336,384 | 8/1994 | Tsou et al. | 204/290 R X |
| 5,531,875 | 7/1996 | Shimamune et al. | 204/290 F X |

*Primary Examiner*—Anthony Skapars
*Attorney, Agent, or Firm*—Sughrue, Mion, Zinn, Macpeak & Seas

[57] ABSTRACT

A gas diffusion electrode comprising
  a porous sheet substrate, at least the surface of which is formed by silver;
  a reaction layer formed on a first surface of the substrate, comprising a porous silver layer and a mixed layer further comprising a hydrophilic material and a hydrophobic material, the mixed layer being formed on a surface of the porous silver layer; and,
  a gas diffusion layer formed on a second surface of the substrate, comprising a hydrophobic material.

The gas diffusion electrode can be stably used for, e.g., sodium chloride electrolysis for extended periods of time even under severe conditions.

3 Claims, No Drawings

GAS DIFFUSION ELECTRODE

FIELD OF THE INVENTION

The present invention relates to a gas diffusion electrode capable of being safely used even under severe conditions, and more particularly to a gas diffusion electrode capable of operating stably for a long period of time in an alkali solution wherein an oxygen gas exists, for example, as in a sodium chloride electrolytic cell.

BACKGROUND OF THE INVENTION

Industrial electrolyses such as caustic alkali electrolysis perform an important role in material industry, but the energy used for such electrolyses is large. Hence, energy efficiency in these electrolyses is a problem.

In caustic alkali electrolysis, an initial mercury method is converted into an ion-exchange method through a diaphragm method resulting in less pollution and energy savings of about 40%. However, the cost for the electric powder accounts for 50% of the total production cost.

For further energy savings, the use of gas diffusion electrodes which have been investigated and developed in the field of cells such as fuel cells has been attempted. When the gas diffusion electrode is applied to an ion-exchange membrane type sodium chloride electrolysis which is the most advanced in energy savings at present, energy savings of more than 50% becomes theoretically possible. Accordingly, various investigations have been made to find ways of practically using gas diffusion electrodes.

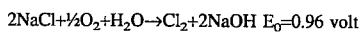

$2NaCl+2H_2O \rightarrow Cl_2+2NaOH+H_2 \quad E_0=2.21 \text{ volts}$ $2NaCl+\frac{1}{2}O_2+H_2O \rightarrow Cl_2+2NaOH \quad E_0=0.96 \text{ volt}$ The structure of the gas diffusion electrode being used for caustic soda electrolysis is of the so-called semihydrophobic (water repellent) type and is characterized by a hydrophilic reactive layer adhered to a hydrophobic gas diffusion layer. Both the reaction layer and the gas diffusion layer use carbon as the main raw material and a PTFE resin as the binder. The PTFE resin is hydrophobic, and by increasing the proportion of the resin in the gas diffusion layer and reducing the proportion of the resin in the reaction layer by utilizing this property, the aforementioned characteristics are exhibited. Furthermore, since in caustic soda electrolysis, the gas diffusion electrode is used in an aqueous caustic alkali solution having a high concentration, the PTFE resin which is a hydrophobic material sometimes becomes hydrophilic. A gas diffusion electrode wherein a thin porous PTFE resin sheet is placed on the gas diffusion layer at the gas chamber side is proposed to prevent this phenomenon.

The surface of the reaction layer carries a catalyst such as platinum, etc., or the catalyst is carried on the surface of carbon constituting the reaction layer. These electrodes are all prepared by using a fluorine resin as the binder, solidifying by heating the fluorine resin together with a carbon powder carrying an electrode substance, and carrying the solidified mixture on a substrate such as titanium, nickel, stainless steel, etc. Production is easy for such electrodes, although such a three-dimensional solid skeleton of forming a strong sheet is not formed as in case of using PTFE, etc. When such a gas diffusion electrode is used as a cathode for carrying out the depolarization of oxygen by sending an oxygen-containing gas, even if the crosslinking of a fluorine resin is insufficient, the gas diffusion electrode can be used under stable operating conditions with a sufficiently satisfactory performance at the beginning of the use since the carried electrode substance can exist stably. However, not only a carbon powder but also a fluorine resin is not always stable in an alkali.

During electrolysis, an oxygen-containing gas is supplied to the gas diffusion electrode, but the oxygen-containing gas forms hydrogen peroxide and the hydrogen peroxide corrodes carbon to form sodium carbonate. Sodium carbonate clogs the gas diffusion layer in an alkali solution, reduces the hydrophobic property of the electrode after extended use and may decrease the activity of the electrode substance. Further, corrosion of the carbon gradually proceeds in only the presence of the catalyst metal even when hydrogen peroxide is not generated.

For solving these problems, the selection and the production method of carbon conventionally used, control of the mixing ratio of the resin and carbon, etc., have been attempted. However, the fundamental problem is not thereby solved in any case, and the progress of the corrosion of the carbon can be delayed but cannot be stopped.

These problems occur as a result of using carbon as a material of a gas diffusion electrode. A gas diffusion electrode using metal having corrosion resistance in place of carbon has been proposed. However, the gas diffusion electrode is produced by a sintering method different from the method of producing a conventional gas diffusion electrode having carbon, and the production method is very complicated. Further, the hydrophilic portion and the hydrophobic portion are difficult to control.

The problems described above are the primary reason why a gas diffusion electrodes have not been widely used in the process of producing caustic soda (sodium hydroxide) and chlorine by sodium chloride electrolysis or producing caustic soda and sulfuric acid by Glauber's electrolysis.

SUMMARY OF THE INVENTION

The object of the present invention is to solve the problems of the conventional techniques described above, that is, the disadvantages that a gas diffusion electrode cannot be used for sodium chloride electrolysis and Glauber's salt electrolysis practically, and to provide a gas diffusion electrode, in particular a gas diffusion cathode capable of being stably used for sodium chloride electrolysis, etc., for a long period of time even in an alkali.

According to the present invention, there is provided a gas diffusion electrode comprising a porous sheet substrate, at least the surface of which is formed by silver, on one surface thereof is formed a reaction layer comprising a porous silver layer and a mixed layer of a hydrophilic material and a hydrophobic material, the mixed layer being formed on the surface of the porous silver layer, and on the other surface thereof is formed a gas diffusion layer comprising a hydrophobic porous material.

The present invention is a gas diffusion electrode comprising a porous sheet substrate, at least the surface of which is formed by silver, having on one surface thereof a reaction layer comprising a porous silver layer and a mixed layer comprising a hydrophilic material and a hydrophobic material, the mixed layer being formed on the surface of the porous silver layer, and on the other surface thereof a gas diffusion layer comprising a hydrophobic porous material.

DETAILED DESCRIPTION OF THE INVENTION

The present invention is described in detail below.

The gas diffusion electrode of the present invention may be used as a cathode for an electrolytic cell used for forming caustic soda (sodium hydroxide) by electrolyzing sodium chloride or Glauber's salt, wherein the cathode is brought into contact with the caustic soda.

In particular, the cathode chamber in electrolysis for a caustic soda is generally filled with an aqueous caustic soda solution having a high concentration of 30% or higher. A gas diffusion electrode is immersed in the high-concentration caustic soda solution as described above. Accordingly, in a reaction layer of a gas diffusion electrode prepared by an ordinary method (that is, a reaction layer formed using a carbon powder and a PTFE resin as the binder), the resin is loosened with the passage of time, and the performance of the reaction layer is changed with the resin becoming gradually hydrophobic.

As a result of various investigations directed to solving these faults and for insuring the maintenance of the three-phase interface in the reaction layer as well as sufficient gas supply, the inventors have accomplished the present invention.

In the present invention, silver is used for the reaction layer portion in place of carbon. For insuring the stability of the molded product of a silver powder, molding with a binder is not carried out but direct sintering of the silver powder is performed instead. For insuring the perforations of proper hole diameters and the porosity, it is desirable that the sintering be a so-called loose sintering. That is, a sintering wherein the particles are bonded to each other by contact only is preferred. By previously controlling the particle size and particle size distribution of the silver powder, a definite size of perforations is always obtained, and since silver is insoluble, when the electrode is used for a long period of time, the perforations scarcely change.

By sintering the silver powder only, the strength may become insufficient, and since the electric resistance among the silver particles slightly increases, the sintered silver powder is formed on the substrate having a high electric conductivity and a high mechanical strength. It is necessary that the substrate be chemically stable in an electrolytic atmosphere as in the silver which forms the reaction layer, and has good adhesive property with silver. The most desirable material having these properties is silver and silver porous mesh material, metal foam, and spongy material made from silver are preferably used. As other materials, a silver-made expanded mesh can be effectively used. A mesh prepared by weaving a silver wire having a diameter of from about 0.01 to 0.5 mm and sintered silver fibers can be used.

The use of silver alone is most suitable. However, for reducing cost, a material having the substantially same performance as silver, that is a material prepared by applying silver plating to the surface of copper or nickel may be used.

The reaction layer comprising silver described above is formed on the substrate. For preparing the reaction layer, silver particles dispersed in a proper dispersion medium may be coated on the substrate and sintered. The particle size of the silver particles used may be properly selected according to the electrolytic condition, etc., and silver particles having a particle size of from about 0.001 to 10 μm are preferred.

Also, for coating the silver particles, the use of the dispersion prepared by simply dispersing silver particles in a dispersing medium is not always stable. Sometimes in the case of using such a dispersion of silver particles, silver particles are not sufficiently dispersed on the substrate. Hence it is preferred that a binder for the coating operation, such as dextrin, etc., be added to prepare a paste of the silver particles. The paste may then be coated on the substrate. It is preferable that the binder be burned away at the beginning of subsequent sintering and does not remain in the product and for this reason, it is also desirable to select dextrin.

There is no particular restriction on the coating method described above, but for obtaining a coated layer having a uniform thickness, the use of a doctor blade method is desirable. It is preferred that the thickness of the coated layer be from about 0.2 to 1 mm, and the coated layer may be dried before sintering.

It is necessary that the sintering is carried out in a non-oxidizing atmosphere in order to prevent the oxidation of metal. It is desirable that the sintering be carried out in a hydrogen gas atmosphere or a reducing atmosphere of nitrogen added with hydrogen at normal pressure and at a temperature of from about 250° to 500° C. for from 15 to 60 minutes. By carrying out the sintering as described above, the silver particles are not collapsed and gaps which allow gas passage and increase the surface area are formed among the silver particles.

Even the reaction layer having only silver has a sufficient catalytic activity, but a catalyst having a higher activity can be further carried on the reaction layer. That is, chloroplatinic acid, or the aqueous solution or alcohol solution thereof may be coated on the surface of the reaction layer and heat-treated in a hydrogen gas atmosphere at about 200° C., whereby the reaction layer can carry thereon a platinum catalyst. The catalyst may be added after surface-treating the reaction layer as will be described below.

Preferably, a surface treatment is applied to the surface of the substrate prepared by the sintering. It is necessary that a liquid and a gas taking part in the reaction move on the surface of the gas diffusion electrode at a very high speed, and for that purpose, it is necessary that a hydrophilic property and a hydrophobic property exist as a microscopic mixture thereof. For attaining such a state, a thin layer of a mixture of a hydrophobic material and a hydrophilic material may be formed on the surface of the reaction layer. For example, as the hydrophobic material, a fluorine resin such as a PTFE resin, etc., may be used, and as the hydrophilic material, a silicon oxide gel may be used. The thin mixed layer described above is formed by coating the mixed liquid of them on the surface of the reaction layer and heating it to a temperature of from 200° to 350° C. for about 30 minutes. In addition, silicon oxide is not always stable in a high-concentration caustic soda solution, but when the oxide is dissolved out, the portions become hydrophilic and thus the result is achieved.

The reaction layer of the gas diffusion electrode may be prepared as described above, and by forming a gas diffusion layer on the opposite surface of the substrate from the reaction layer surface, the gas diffusion electrode is prepared. Since a sufficient porosity is provided by the reaction layer, a sufficient hydrophobic property is attained. During the formation of the reaction layer or after the formation of the reaction layer, a hydrophobic layer comprising, for example, a fluorine resin may be formed on the opposite surface of the substrate from the reaction layer. For enhancing the hydrophobic property, a sheet formed by stretching the PTFE resin sheet having a thickness of from about 0.01 to 2 mm to form fine holes therein may be thermally adhered to the surface of the gas diffusion layer.

Examples of the gas diffusion electrode of the present invention and the electrolytic method using the electrode are described below, but the invention is not limited by these examples.

EXAMPLE 1

A 0.5 mm thick silver metal foam having a porosity of 90% and through-holes having an inside diameter of from 0.01 to 1 mm was used as a substrate, and the surface of the substrate was activated by pickling with a 15% hydrochloric acid solution.

Silver particles having a particle size of from 50 to 100 μm were kneaded with ethanol to form a paste. The paste was coated on one surface of the substrate obtained above at a thickness of about 200 μm. The substrate thus coated was sintered by heating to 450° C. for 15 minutes in an atmosphere of streaming a mixed gas of 20% hydrogen and 80% argon to obtain a silver porous metal sheet substrate having through-holes of from 1 to 10 μm in the inside diameter.

A suspension comprising 10% silica sol and 90% a PTFE resin was thinly coated on the sintered surface of the substrate. A porous PTFE resin sheet having a thickness of 0.1 mm was adhered to the opposite surface of the substrate using a suspension of a PTFE resin as a binder. Further, the substrate was heated to 300° C. for 15 minutes in air.

An aqueous solution of chloroplatinic acid was coated on the sintered surface side of the sheet thus formed and heated to 220° C. for 15 minutes in a hydrogen gas atmosphere to obtain a gas diffusion electrode carrying platinum as a catalyst.

The gas diffusion electrode thus prepared was mounted in the cathode chamber side of a two-chamber type electrolytic cell using a cation-exchange membrane as a diaphragm. Further a gas chamber for supplying gas was formed at the cathode chamber side.

As an anode, an insoluble anode prepared by applying Ru-TiO$_2$ to an expanded mesh having a thickness of 0.5 mm was placed such that the anode was in contact with the cation-exchange membrane.

Electrolysis was carried out at a current density of 30 A/dm$^2$ while circulating 200 g/liter of an aqueous sodium chloride solution through the anode chamber, circulating an aqueous 32% caustic soda solution through the cathode chamber and also supplying air wherein the concentration of carbon dioxide was reduced to 1 ppm or lower to the cathode chamber in an amount of 3 times the theoretical amount. The initial cell voltage was 2.3 volts and when the electrolysis was continued for 200 days, the cell voltage was maintained at a value of from 2.3 to 2.4 volts. No possibility of causing a liquid leakage to the gas chamber side caused by that the cathode became hydrophilic was observed.

EXAMPLE 2

By following the same procedure as in Example 1 except that a metal foam made of copper plated with silver was used in place of using the silver metal foam, a gas diffusion electrode was prepared.

Since in such a gas diffusion electrode, there is the possibility of causing the corrosion of the electrode, the gas diffusion electrode was immersed in an aqueous 32% caustic soda solution containing 1,000 ppm sodium sulfide and the potential was maintained at 0 V vs NHE near the practically using potential. The dissolution of copper was not observed even after keeping for 30 days at a liquid temperature of 90° C.

EXAMPLE 3

A gas diffusion electrode was prepared by following the same procedure as in Example 1 except that a metal mesh prepared by weaving a nickel wire of 0.2 mm diameter, the surface of which was placed with silver, was used in place of the silver metal foam. Electrolysis was carried out using the gas diffusion electrode under the same conditions as in Example 1.

In this case, the initial cell voltage was 2:35 volts, which was almost the same as that in Example 1, and after continuing the electrolysis for 200 days, the cell voltage was maintained at 2.35 volts.

In a conventional gas diffusion electrode, the reaction layer is constituted by silver and carbon which is easily corroded. In the instant invention, such is not used. Hence, lowering of the hydrophobic property of a fluorine-containing material by continued electrolysis over an extended time, is restrained and stable operation becomes possible.

Attempts at using conventional gas diffusion electrodes as an oxygen cathode for sodium chloride electrolysis have almost always been frustrated by the decreased hydrophobic property of the oxygen cathodes in an alkali solution. On the other hand, according to the present invention, a practical gas diffusion electrode for producing caustic soda by sodium chloride electrolysis and Glauber's electrolysis is provided for the first time.

Also, when bonding the silver particles of a gas diffusion electrode with each other is performed by so-called loose sintering, control of the particle size and particle size distribution of the sintered silver particles formed becomes easy. Thus a gas diffusion electrode having a definite performance can be easily obtained from such method.

For prolonging the life of a gas diffusion electrode, it is necessary to improve the corrosion resistance of the substrate on which the reaction layer is formed in addition to improving the corrosion resistance of the reaction layer of the gas diffusion electrode. It is desirable to constitute the substrate with silver or copper or nickel plated with silver. There is no particular restriction on the form of the substrate if the substrate is porous and, for example, the form may be a silver foam, a silver spongy material, a structural material prepared by weaving silver fibers, etc.

While the invention has been described in detail and with reference to specific embodiments thereof, it will be apparent to one skilled in the art that various changes and modifications can be made therein without departing from the spirit and scope thereof.

What is claimed is:

1. A gas diffusion electrode comprising:
   a porous sheet substrate, at least the surface of said substrate being formed by silver;
   a reaction layer formed on a first surface of the substrate, said reaction layer comprising a porous silver layer and a mixed layer further comprising a hydrophilic material and a hydrophobic material, said mixed layer being formed on a surface of the porous silver layer; and,
   a gas diffusion layer formed on a second surface of the substrate and comprising a hydrophobic material.

2. The gas diffusion electrode of claim 1, wherein the porous silver layer is formed by sintering a silver powder by loose sintering.

3. The gas diffusion electrode of claim 1, wherein the porous sheet substrate is a member selected from the group consisting of a silver foam, a foam comprising copper or nickel plated with silver, a silver spongy material, and a silver fiber structural material.

* * * * *